United States Patent
Barcus

[11] 4,244,098
[45] Jan. 13, 1981

[54] METHOD OF ASSEMBLING A DYNAMOELECTRIC MACHINE AND AN AUXILIARY COOLING DEVICE

[75] Inventor: Victor D. Barcus, Churubusco, Ind.

[73] Assignee: General Electric Company, Fort Wayne, Ind.

[21] Appl. No.: 909,635

[22] Filed: May 26, 1978

Related U.S. Application Data

[62] Division of Ser. No. 539,583, Jan. 8, 1975, Pat. No. 4,105,905.

[51] Int. Cl.³ ............................................ H02K 15/14
[52] U.S. Cl. ........................................ 29/596; 29/450; 165/76; 165/80 B; 165/82; 165/183; 165/185; 310/42; 310/64
[58] Field of Search ................... 29/596, 157.3 A, 450, 29/453; 310/64, 65, 42, 273; 165/76, 77, 82, 80 R, 80 B, 183, 185, 169

[56] References Cited

U.S. PATENT DOCUMENTS

| 720,307 | 3/1903 | Wood | 310/271 |
|---|---|---|---|
| 1,568,727 | 1/1926 | Frank | 165/106 |
| 2,161,417 | 6/1939 | Holmes | 165/134 |
| 2,574,142 | 11/1951 | Byongirno | 29/157.3 A |
| 2,761,984 | 9/1956 | Adam et al. | 310/64 |
| 3,135,882 | 6/1964 | Mollenberg | 310/57 |
| 3,147,798 | 9/1964 | Mosher et al. | 165/185 |
| 3,213,304 | 10/1965 | Landberg et al. | 310/57 |
| 3,383,529 | 5/1968 | Baumann et al. | 310/52 |
| 3,749,949 | 7/1973 | Muller | 310/59 |

FOREIGN PATENT DOCUMENTS

| 1538727 | 7/1969 | Fed. Rep. of Germany | 29/596 |
|---|---|---|---|
| 2150881 | 4/1973 | Fed. Rep. of Germany | |

*Primary Examiner*—Carl E. Hall
*Attorney, Agent, or Firm*—Ralph E. Krisher, Jr.

[57] ABSTRACT

A cooling shell arrangement is assembled about an outer periphery of a housing of a dynamoelectric machine. The cooling shell arrangement comprises at least two extruded sections of arcuate shaped cooling members having cooling fins and at least two locking members fixedly holding the at least two sections in a predetermined position on the outer peripheral surface of the housing so that elongation of the at least two sections caused by thermal expansion is accommodated by the at least two locking members. Hoop tension is maintained in the at least two sections over a predetermined temperature range. The cooling shell arrangement improves the transfer of heat from the outer peripheral surface of the housing.

1 Claim, 3 Drawing Figures

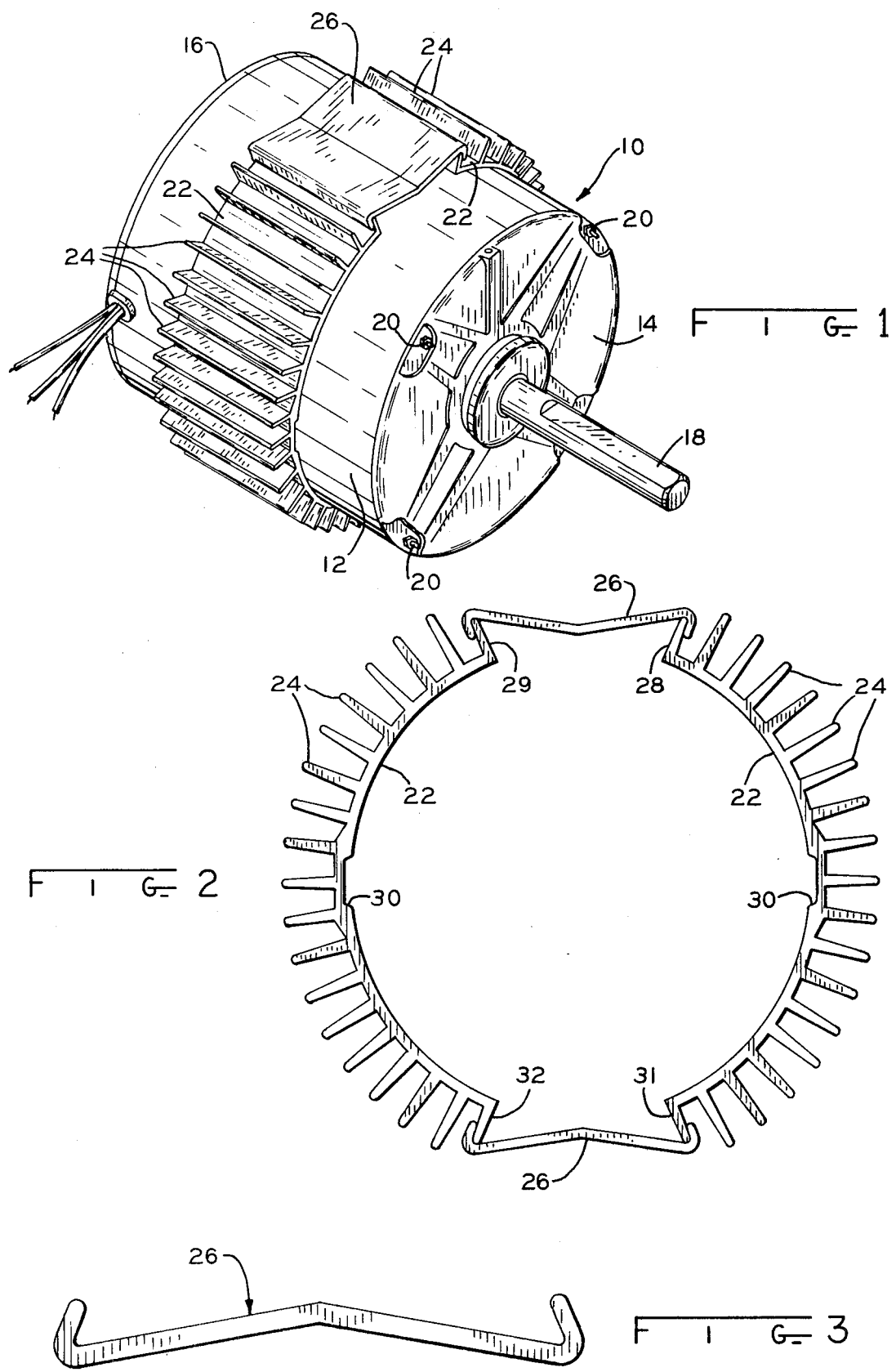

METHOD OF ASSEMBLING A DYNAMOELECTRIC MACHINE AND AN AUXILIARY COOLING DEVICE

CROSS REFERENCE TO RELATED APPLICATION

This application is a division of my co-pending application Ser. No. 539,583 which was filed Jan. 8, 1975; which issued as U.S. Pat. No. 4,105,905 on August 8, 1976 and the entire disclosure of which is incorporated herein by reference.

BACKGROUND OF THE INVENTION

The present invention relates to improvements in dynamoelectric machines and more particularly to improved methods of assembling a cooling arrangement on the outer surface of a dynamoelectric machine housing without damaging the finish thereof.

In certain applications, electric motors are used as direct drive fan motors in heating and air conditioning systems. Generally these motors are not self cooled; and are cooled by air drawn over the motor by the fan. Electric motors often are subject to being operated in high moisture environments especially in such applications as room air conditioners and outdoor condensing units. Accordingly, it has become general practice to design electric motors for such applications having drip-proof or totally enclosed housings to protect internal parts of the electric motor from moisture or water.

Electric motors, of course, include heat generating components; e.g., bearings, stator core, and excitation windings, and when the heat generating components of the motor are effectively enclosed, a major difficulty has been experienced in satisfactorily dissipating the generated heat from the interior of the motor.

If this heat is not effectively removed from the motor, it will have the general effect of increasing the resistance of the windings and the total temperature rise of the motor, thereby producing a marked decrease in the motor performance. Moreover, increased operating temperatures of the motor may adversely affect bearing materials and lubricants and other temperature sensitive motor components; e.g., electrical insulation, which can lose its mechanical and dielectric strengths at high temperatures, eventually resulting in premature motor failure. Therefore it should be apparent that there is a need for a device to minimize excessive temperature rises and thereby reduce motor power losses. Such a device should preferably be a device which can be added to an existing motor design as an auxiliary piece of hardware. Thereby the economics of high volume production for existing motor designs could be retained and the heat dissipation problem could be improved in applications where additional cooling means are required.

In the past, electric motors have been manufactured with a cast outer shell having fins formed therein so that the fins could aid in dissipating some of the heat in the outer housing. However, such motors are expensive and tend to be limited to applications requiring additional cooling aid since the additional expense would not warrant using such a motor in an application not requiring additional cooling. Another auxiliary cooling scheme used in the past was to weld corrugated sheet metal to the outer housing of an electric motor. However, such corrugated fins do not dissipate as much heat as a cast fin dissipates and in addition after the welding was completed, the motor would require repainting to restore its outer finish to an acceptable appearance.

Another cooling arrangement that has been suggested in the past was to put an extruded aluminum fin shell around the outer housing of the electric motor. The extruded aluminum fin shells were interlocked to each other and then slid or press fitted onto the outer housing of the electric motor. Press fitting or sliding the extruded aluminum fin shells over the outer housing could damage the finish on the outer surface of the housing which would then have to be retouched to restore an acceptable appearance to the motor's outer housing.

Therefore, it is a principal object of the present invention to provide an improved method of assembling auxiliary cooling means on a fully manufactured dynamoelectric machine.

Another object of this invention is to provide a dynamoelectric machine having an improved cooling arrangement for effectively removing and dissipating the heat, which is generated, from the motor housing.

A still further object of the invention is to provide an improved method of assembling a cooling arrangement for transferring heat from the housing of a dynamoelectric machine, with such machine without defacing the finish on an outer housing of the machine.

SUMMARY OF THE INVENTION

In carrying out the above and other objects of the invention in one form thereof, I provide an assembly comprising a dynamoelectric machine including a stationary structure having a finished outer peripheral surface and a cooling arrangement assembled on the outer peripheral surface which does not require either press fitting or another manufacturing operation which could deface the finished outer peripheral surface. The cooling arrangement comprises at least two extruded sections of arcuate shaped cooling shells having cooling fins and at least two locking members fixedly holding the at least two sections in a predetermined position on the outer peripheral surface of the dynamoelectric machine so that elongation of the at least two sections caused by thermal expansion is accommodated by the at least two locking members. The cooling arrangement is maintained in hoop tension around the outer peripheral surface over a predetermined temperature range. Preferably, the cooling arrangement is made from extruded aluminum.

In a general form of the invention, a method is practiced that includes the step of assembling a cooling arrangement around the outer peripheral surface of a dynamoelectric machine by moving at least a pair of cooling members radially into contact with the outer peripheral surface of the machine; engaging a first end of one of the pair of cooling members and an end of another one of the pair of cooling members with a locking member; holding the at least a pair of cooling members in tension around the outer peripheral surface of the housing of the dynamoelectric machine; and engaging the opposite ends of the one and the another one of the pair of cooling members with the another locking member to maintain the at least a pair of cooling members in a fixed position on a dynamoelectric machine.

The subject matter which I regard as my invention is set forth in the appended claims. The invention itself, however, together with further objects and advantages thereof, may be better understood by referring to the following detailed description taken in conjunction with the accompanying drawings.

BRIEF DESCRIPTION OF THE DRAWINGS

FIG. 1 is a perspective view of an electric motor and cooling arrangement assembly that illustrates how the invention may be utilized in one form;

FIG. 2 is a plan view of the cooling arrangement; and

FIG. 3 is an end view of a locking member from FIG. 2.

The exemplifications set out herein illustrate the preferred embodiments of the invention in one form thereof, and such exemplifications are to be constructed by way of exemplification rather than limitation.

DESCRIPTION OF THE PREFERRED EMBODIMENTS

Referring now to the drawings in more detail, there is shown a dynamoelectric machine, generally identified by numeral 10, which for purposes of exemplification is a totally enclosed fan-cooled alternating current type fractional or small integral horsepower electric motor. As seen in FIG. 1, the motor comprises a housing 12 enclosed at each end by end shields 14, 16 and having a shaft 18 protruding through end shield 14 (and end shield 16 if desired). Shaft 18 is rotatably supported in end shields 14, 16. A plurality of angularly spaced apart bolts 20 extend through end shields 14, 16 to secure the end shields 14, 16 to housing 12. Two cooling members 22 are fixedly held on the outer peripheral surface of housing 12 by two locking members 26, one of which is hidden by the housing 12. Each cooling member 22 has a plurality of projections or fins 24.

Cooling members 22 and locking members 26 comprise a cooling arrangement which is held in hoop tension around the outer peripheral surface of housing 12. The hoop tension is of such a magnitude that it would take several hundred pounds of force in an axial direction to slide the cooling arrangement along the surface of housing 10. This hoop tension will insure that the cooling arrangement will remain in a fixed position even if the electric motor were to reach a maximum permissible temperature during operation (e.g., a temperature in a predetermined range from 40° C. (ambient) to about 135° C.) and even considering that the coefficient of thermal expansion of the extruded aluminum cooling arrangement would be greater than that of housing 12. The width, in an axial direction, of cooling members 22 may vary from a very narrow band to the entire axial length of housing 12. However, it is preferable to make the width of cooling members 22 equal to the stator core height of the stator core within the electric motor and the cooling members 22 are most effective, for transferring the internal heat of the motor from housing 12, when they overlie the stator core. The width of a cooling member chosen in practice usually will be a practical compromise between the cost of manufacturing the cooling members and the amount of additional cooling that is required in a given application.

Referring now to FIG. 2 there is illustrated an end view of FIG. 1 but with dynamoelectric machine 10 not shown to more clearly illustrate the cooling arrangement. Cooling members 22 are held together by locking members 26 which fit over end fins which do not extend to the same radial length as fins 24. These end fins 28, 29, 31, and 32 are shortened so that the auxiliary cooling device comprising cooling members 22 and locking members 26 does not project as far from the outer peripheral surface of housing 12 in the vicinity of locking members 26 as do fins 24. Therefore a motor mount having a low clearance could still be employed by positioning a locking member adjacent to the motor mount.

In a preferred method of assembling the cooling arrangement around an electric motor, cooling members 22 are positioned around the outer peripheral surface of the electric motor and the cooling members 22 are engaged or joined by a locking member 26 initially being placed over adjacent end fins, e.g., fins 28, 29. Opposite end fins 31, 32 are then pulled toward each other by a portion thereof so that another locking member 26 may be axially started over the end fins and then forced over the axial length of end fins 31, 32. Pulling and holding cooling members 22 by end fins 31, 32 insures that the inner surfaces of cooling members 22 are in direct contact with the outer peripheral surface of housing 12 shown in FIG. 1. The design of cooling members 22 takes into account the design tolerances of the outer dimension of housing 12, and when a housing is encountered having a maximum allowable outer dimension, end fins 31, 32 may be deformed slightly when holding or engaging cooling members 22 around the housing so that locking member 26 can be axially started over the end fins. Then once locking member 26 is started over end fins 31, 32, it may be necessary to force locking member 26 on with a soft mallet. The cooling arrangement is maintained in hoop tension around housing 12 and it would take several hundred pounds of force to move the cooling arrangement axially along housing 12 once the cooling arrangement is assembled.

If housing 12 has a welding seam, the seam may be accommodated by notches or indentations 30 of cooling member 22 or alternatively the welding seam could be positioned between end fins 28, 29 or end fins 31, 32. Locking members 26 advantageously may be positioned at locations around the housing to avoid interference with a structure (e.g., a mounting base) adjacent to which the housing 12 may be mounted.

As best illustrated in FIG. 2, each cooling member 22 spans approximately 140 degrees, however it will be understood that cooling members 22 could span a lesser or somewhat greater portion of the housing 12. It has been found that the temperature rise of housing 12, when provided with a cooling member spanning the entire circumference thereof, is approximately six degrees Centigrade less than its temperature rise when cooling members 22 span approximately 270 degrees. Nonetheless, it is preferable that each cooling member 22 should not span more than 175 degrees of housing 12 thereby to allow for thermal expansion of cooling member 22. When cooling members 22 each span an arcuate length approaching 180 angular degrees then the end fins should be angled away from each other so as to avoid being approximately parallel to each other and thereby better retain locking member 26. The angular span of locking member 26 is governed by the angular span between the end fins of cooling members 22. Thus, if cooling members 22 cover a total of 350 angular degrees (end fin to end fin), then locking members 26 would accumulatively span a total of ten degrees.

As illustrated in FIG. 3 locking member 26 has a bow in its central portion which, it is believed, may be of utility in allowing locking member 26 to expand during assembly if required (assuming of course that the dimensions and material characteristics of member 26 are such that expansion will occur rather than fin deformation).

It will now be appreciated that I have provided an improved method of assembling a cooling arrangement with a dynamoelectric machine. The cooling arrangement is an auxiliary cooling device that can readily be assembled around the outer peripheral surface of a finished dynamoelectric machine without damage to the outer finish. The cooling arrangement can be assembled on the outer peripheral surface of a dynamoelectric machine without press fitting or preheating or any other manufacturing operation which would entail cooling or shrink fitting.

The cooling arrangement can be used on a mass produced electric motor thereby taking advantage of such production methods and yet permitting such mass produced motors to be used in special applications requiring additional cooling. In some applications, the use of my improved cooling arrangement may permit the use of a one and one-half inch long stator rather than a two inch stator and it will therefore be appreciated that the use of my cooling arrangement can result in an overall cost reduction for a motor for a given application.

Consequently, while in accordance with the Patent Statutes I have described what at present are considered to be the preferred forms of my invention, it will be obvious to those skilled in the art that numerous changes and modifications may be made herein without departing from the true spirit and scope of the invention, and it is therefore aimed in the following claims to cover all such modifications.

What I claim as new and desire to secure by Letters Patent of the United States is:

1. A method of assembling a cooling shell arrangement in heat transferring relationship with an outer peripheral surface of a housing of a previously fully manufactured and finished dynamoelectric machine without press fitting, preheating, or defacing the finish on such housing, said cooling shell arrangement including two extruded, arcuate shaped cooling fin sections each providing an arcuate shaped inner peripheral surface substantially conforming to the curvature of said outer peripheral housing surface, the method comprising: moving said two arcuate shaped cooling fin sections radially against said housing to make substantially simultaneous contact between all portions of each conforming inner peripheral surface and the previously finished outer peripheral surface of said housing of the dynamoelectric machine; positioning said cooling fin sections with first ends thereof sufficiently close to one another to permit clamping thereof; engaging the first ends of the cooling fin sections with a locking and tensioning member and locking such first ends together; holding the cooling fin sections in tension around the outer peripheral surface of the housing with second ends thereof sufficiently close to permit clamping thereof; and engaging the second ends of the two cooling fin sections with another locking and tensioning member so that said cooling fin sections are locked together and held in tension about the housing and thereby maintained under tension in a fixed position on the finished housing.

* * * * *